United States Patent [19]

Utsugi et al.

[11] Patent Number: 4,630,138
[45] Date of Patent: Dec. 16, 1986

[54] CONTROL APPARATUS FOR CONTROLLING RECORDING OF A SCENE FOR USE IN IMAGE RECORDING SYSTEM

[75] Inventors: Mikio Utsugi; Masahiro Fukuda, both of Tokyo, Japan

[73] Assignee: Fuji Photo Film Co., Ltd., Kanagawa, Japan

[21] Appl. No.: 624,335

[22] Filed: Jun. 25, 1984

[30] Foreign Application Priority Data

Jun. 29, 1983 [JP] Japan ................................ 58-115942

[51] Int. Cl.[4] ............................................. H04N 5/78
[52] U.S. Cl. .................................. 360/33.1; 360/14.1
[58] Field of Search ..................... 360/14.1, 14.2, 14.3, 360/35.1, 33.1; 358/335, 311, 906

[56] References Cited

U.S. PATENT DOCUMENTS

| | | | |
|---|---|---|---|
| 3,655,910 | 4/1972 | Wada et al. ......................... | 360/14.2 |
| 3,943,563 | 3/1976 | Lemelson ............................ | 360/35.1 |
| 4,057,830 | 11/1977 | Adcock ............................... | 360/35.1 |
| 4,163,263 | 7/1979 | Rotter ................................. | 360/14.1 |
| 4,316,224 | 2/1982 | Hansen et al. ...................... | 360/14.2 |
| 4,428,001 | 1/1984 | Yamamura et al. ................. | 360/14.1 |
| 4,463,391 | 7/1984 | Takano et al. ...................... | 360/14.2 |
| 4,466,029 | 8/1984 | Tanaka ................................ | 360/14.2 |
| 4,467,371 | 8/1984 | Kobayashi et al. ................. | 360/14.3 |
| 4,482,926 | 11/1984 | Nishijima et al. ................... | 360/14.2 |
| 4,520,406 | 5/1985 | Suzuki et al. ....................... | 360/14.2 |
| 4,532,558 | 7/1985 | Oota et al. .......................... | 358/906 |

*Primary Examiner*—Donald McElheny, Jr.
*Attorney, Agent, or Firm*—Birch, Stewart, Kolasch and Birch

[57] ABSTRACT

Apparatus for controlling recording of a scene for use in an image recording system adapted for recording images on a magnetic recording medium by consecutive shooting is described. The apparatus includes a magnetic recording device for recording images on the recording medium, and a control unit for sequentially changing the relative position of the magnetic recording device with respect to the recording medium. The controlling apparatus controls the imaging or photographing operation performed by the recording apparatus on a scene by scene basis. The controlling apparatus has a storing unit for storing information associated with a point on the recording medium corresponding to the start of a recorded scene during consecutive shooting. The control unit includes a restoring circuit responsive to a signal that instructs reshooting to restore the relative position of the magnetic recording device with respect to the recording medium to the point on the recording medium corresponding to the start of the scene in accordance with the information stored by the storing unit.

9 Claims, 6 Drawing Figures

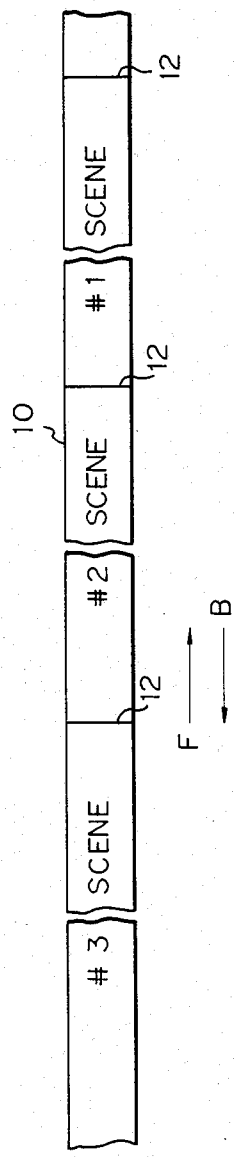
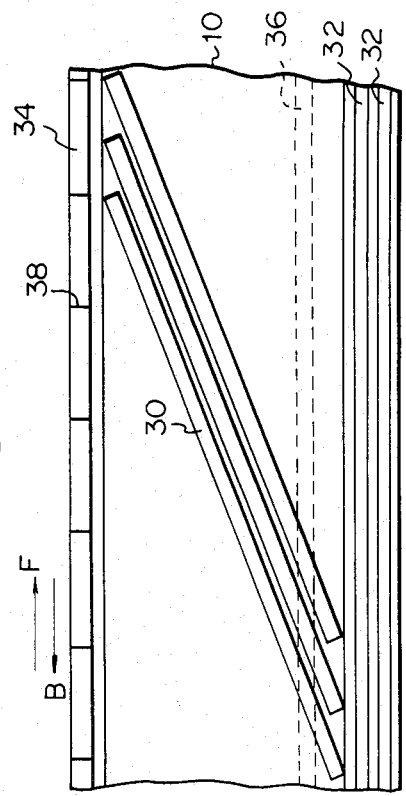
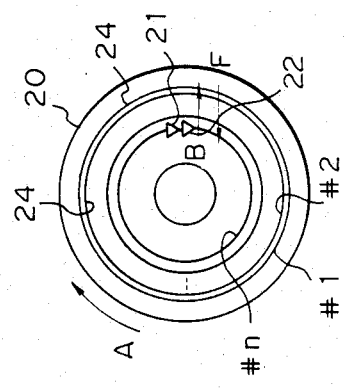

CONTROL APPARATUS FOR CONTROLLING RECORDING OF A SCENE FOR USE IN IMAGE RECORDING SYSTEM

BACKGROUND OF THE INVENTION

1. Field of the Invention

The present invention relates to an image recording system, and especially to apparatus for controlling over recording of a scene for use in an image recording system in which the images are recorded on a rewritable recording medium including a magnetic recording medium such as magnetic tape or magnetic disk.

2. Description of the Prior Art

There is known a portable image taking and image recording apparatus which is composed of a television (TV) camera and a magnetic tape recorder connected to each other or combined into a unitary device. In such an apparatus, a sequence of recording images, which will give an impression of continuous motion when the recording images are being reproduced on an image monitor, can be obtained by continually actuating the shutter release button thereof for a desired period of time with its lens directed toward an object. Such a sequence of recorded images including a single scene constitutes an imaging unit called a "cut" or a "shot". It is also possible with an electronic still camera, which includes a solid-state imaging device combined with a magnetic-disk recorder in a single casing, for example, to take a continuous sequence of shots of still images by operating the camera in a consecutive mode.

In the continuous shooting operation, an operator may become aware of a failure in shooting in the course of or immediately after termination of the shooting of one scene, such failure being caused by an obstacle traversing the scene before the object, failure in focusing, excess camera shake, or the object failing to move as desired.

In a cinecamera which makes use of a conventional silver-halide photosensitive material type photographic film, when such failure is noticed by the operator, he or she may take consecutive shots as a new scene on an unexposed length of film. This causes however a wasting of film and a complicated editing operation.

In the conventional magnetic recording system, it is possible to record again a new scene over that portion of a magnetic recording medium where the previous unsuccessful scene is recorded. However, difficulties are experienced in locating the starting point of the unsuccessful scene recorded.

Such a starting point can be located by loading the thus unsuccessfully recorded magnetic recording medium in an image reproducing device to monitor the reproduced image on an image monitor. This is however unpractical because such a reproducing device is usually not available at the site of shooting for a prompt reproducing operation. Even when the starting point of the scene in question is located in this manner, the scene one desires to shoot may be lost once and for all, and there may be the chance that the scene will not present itself again. It is therefore a customary practice that a new scene be recorded on an unused portion of the magnetic recording medium. In this case, however, there is no possibility of taking advantage of rewritability of the magnetic recording medium, thus causing an inconvenience similar to that which occurs when photographic film is used as mentioned hereinabove.

SUMMARY OF THE INVENTION

It is therefore an object of the present invention to obviate, these disadvantages of the prior art and to provide an apparatus for controlling recording of a scene for use in an image recording system, which allows consecutive shots corresponding to an unsuccessfully recorded scene to be taken by a simplified operation without wasting of a recording medium.

According to the present invention, there is provided an apparatus for controlling recording of a scene for use in an image recording system for recording images on a magnetic recording medium by consecutive shooting, including magnetic recording means for recording images on the recording medium, control means for sequentially changing the relative position of said magnetic recording means with respect to said recording medium, and storing means for storing information associated with a point on the recording medium corresponding to the start of a recorded scene during consecutive shooting, said control means including restoring means, responsive to a signal that instructs reshooting, for restoring the relative position of said magnetic recording means with respect to said recording medium to a point on the medium corresponding to the start of the scene in accordance with the information stored by said storing means In the present specification, the term "consecutive imaging or shooting" may be understood to cover both movie shooting and consecutive still shooting mentioned above.

BRIEF DESCRIPTION OF THE DRAWINGS

The objects and features of the present invention will become more apparent from the consideration of the following detailed description taken in conjunction with the accompanying drawings in which:

FIG. 1 is a diagrammatic representation showing an aspect of image recording on a length of magnetic tape on which different scenes are recorded consecutively;

FIG. 2 is a diagrammatic view useful for understanding consecutive shooting on a magnetic disk;

FIG. 4 shows an example of the recording format on recording tape as applied to the apparatus of the present invention;

DESCRIPTION OF THE PREFERRED EMBODIMENTS

Figure 3:
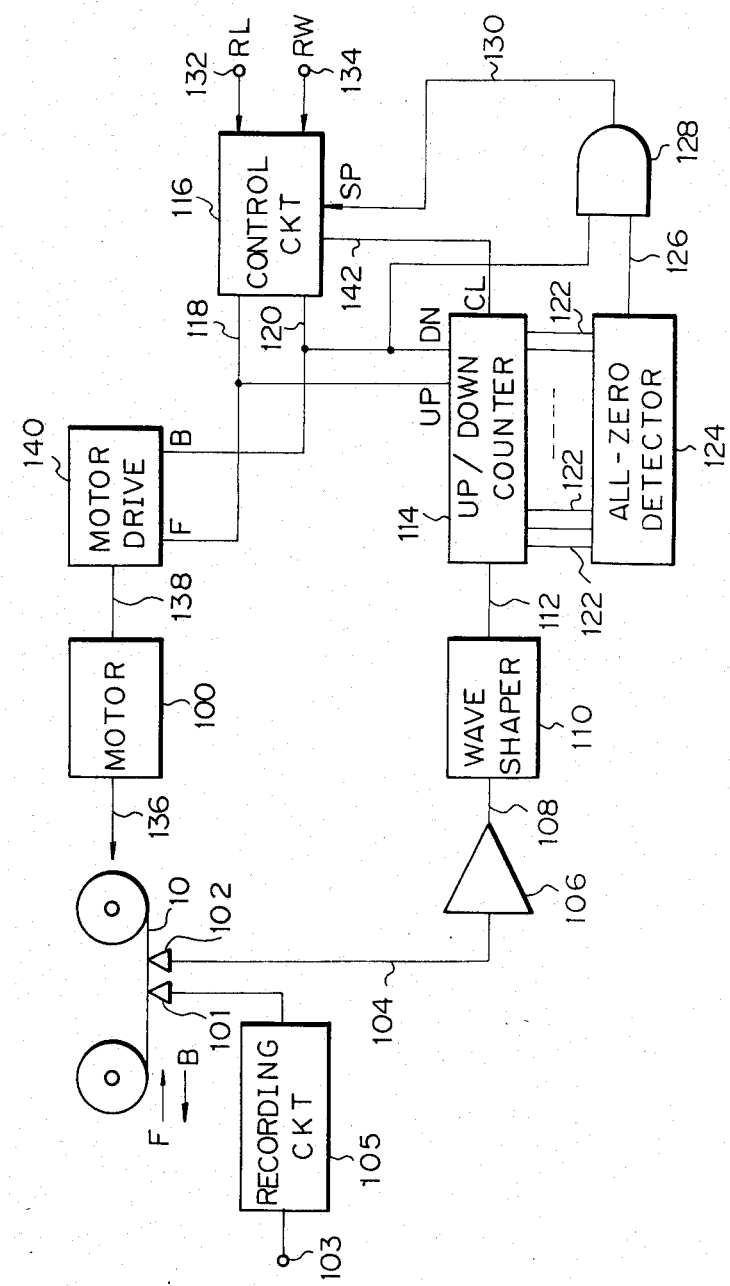
FIG. 3 is a schematic block diagram showing an embodiment of apparatus for controlling recording of a scene in accordance with the present invention when applied to a magnetic tape recorder.

In the accompanying drawings, there are shown certain preferred embodiments of an apparatus for controlling recording of a scene for use in an image recording system according to the present invention.

As shown in FIG. 1, an elongated recording medium 10 such as video tape is caused to travel forward as shown by the arrow F for shooting and recording first, second and third cuts, or scenes, in this order. When an operator has noticed a failure during shooting of a third scene for example, he or she may cause the tape 10 to travel in the backward direction B as far as a starting point 12 of that scene for successively restarting the shooting thereat in order to avoid wasting tape 10 and a troublesome editing operation.

This may also be the case with a rotating recording medium 20 such as magnetic disk shown in FIG. 2. During consecutive movie or still shooting, as the disk 20 is rotated at a constant sheed in the direction of the arrow A, a video recording head 21 is translated in a forward direction F for consecutively recording scenes or images on a series of continuous recording tracks 24 in the order of fields or frames #1, #2, ..., #n. When the operator becomes aware of a failure in consecutive shooting, magnetic head 21 is shifted in the backward direction B for returning to the track corresponding to #1 field or track, from which shooting may be started again.

FIG. 3 shows an embodiment of an apparatus for controlling recording of a scene of the type described above and applied to a movie shooting recorded with a television camera and magnetic tape. An elongated magnetic recording medium 10 such as magnetic tape may be fed by an electric motor 100 in the forward direction F or in the backward direction B. A magnetic reading head or transducer 102 is positioned in contact with the magnetic tape 10.

A recording format on magnetic recording tape, i.e. video tape applicable to a helical scanning type of recording, which is shown in FIG. 4, is comprised of video tracks 30, audio tracks 32, a control track 34, and a cue track 36. Timing marks 38 for synchronous control are recorded on the control track 34. The magnetic head 102 is a sensing or playback head placed on the control track 34 for detecting these timing marks 38.

Magnetic head 102 has an output 104 connected to a wave shaper 110 through a sensor amplifier 106. Wave shaper 110 has an output 112 connected to a reversible or up/down counter 114, which is a binary counter incremented or decremented in response to pulses received by the input 112 under the control of count-up signals UP or count-down signals DN supplied respectively from outputs 118, 120 of the control circuit 116. The counter 114 has its reset terminal CL connected to the control circuit 116 in such a manner that, when it receives clear signals applied thereto on lead 142 from the control circuit 116, it is reset to its initial state, in which every counter stages thereof includes null in the present example.

Counter 114 has a number of outputs 122, associated with respective counting stages of the counter 114, connected to an all-zero detector circuit 124, which has output 126 connected to one input of a two-input AND gate 128. The detector 124 is a decoder adapted for decoding the logical states of the respective stages of the counter 114 to determine whether or not they are all binary zero. In a system in which counter 114 is initialized to a predetermined state such as all "1", other than all "0", the internal circuit connection of the detector 124 is to be modified accordingly for detecting the predetermined state.

AND gate 128 has its other input port connected to a control output 120 of the control circuit 116, and its output 130 is connected to the control circuit 116 to produce stop signal SP.

To terminals 132 and 134 of the control circuit 116, there will respectively be supplied a release signal RL in response to a shutter release button or shooting button, not shown, on the shooting side of the camera actuated, and a rewind signal RW in response to a reshooting button, not shown, actuated. The rewind signal RW is used for instructing control circuit 116 to drive tape 10 in the backward direction B for reshooting a new scene. Responsive to these signals, the control circuit 116 operates to control the overall operation of the present controlling apparatus.

The electric motor 100 operates to feed the tape 10 in either one of the forward and backward directions F and B as symbolically shown by arrow 136. The motor 100 is supplied with exciting current by a motor driving circuit 140, which is connected to control outputs 118 and 120 of the control circuit 116, in such a manner that, when a forward signal F is supplied thereto from control circuit 116, the motor 100 is driven forward for advancing the tape, and, when a backward signal B is supplied thereto, the motor 100 is driven in the reverse direction for feeding the tape 10 backward.

The illustrative embodiment includes a recording head assembly 101, symbolically shown as a single unit, which is positioned close to sensing head 102 and comprises recording heads for recording video and control signals respectively on video tracks 30, and control tracks 34, 36 on tape 10. The video signals are supplied from the camera to input port 103 to a recording circuit 105, which in turn produces video signals to recording head assembly 101 together with control signals, such as of timing marks 38, generated in circuit 105.

In operation, upon receipt of shutter button release signal RL, control circuit 116 produces a signal F on lead 118 so as to cause the motor driving circuit 140 to drive the motor 100 forward for advancing the tape 10 for recording a series of images involved in one scene. It is of course possible to record sound simultaneously. Timing marks 38 are also recorded concurrently on the control track 34 of the tape 10.

Responsive to the positive-going edge of signal RL, control circuit 116 actuates lead 142 for resetting the counter 114 to its initial state. During tape travel in the forward direction F, signals indicating the timing marks 38 on the control track are reproduced by the magnetic head 102 and amplified by amplifier 106 to be then supplied to a clock input 112 of counter 114 after formed into a rectangular pulse at the waveform shaping circuit 110. The forward signal F supplied to the control output 118 of the control circuit 116 is also supplied to a count-up command input UP of counter 114. In turn, counter 114 counts up those pulses supplied thereto over lead 112.

When the operator becomes aware that he or she has failed in shooting a scene, and then resets the release button for trying reshooting, control circuit 116 is responsive thereto to deenergize the signal F to stop the motor 100. A current count is maintained in the counter 114.

When the operator actuates the reshooting button, signal RW is introduced into control circuit 116. The circuit 116 is responsive thereto to produce the signal B on lead 120 so as to cause the motor driving circuit 140 to drive the motor 100 backward for feeding the tape 10 in the backward direction B. The tape is preferably driven in this direction at a faster speed than when the tape is driven in the forward direction F.

During tape travel in the backward direction B, the signal indicating the timing marks 38 of the control track are reproduced by the magnetic head 102 to be supplied to clock input 112 of the reversible counter 114 in the form of rectangular pulses as in the forward operation described above. The backward signal B developed from the control output 120 of the control circuit 116 is also supplied to a count-down command input DN of the counter 114. Responsive to this command, counter 114 counts down the pulses supplied over lead 112.

The count held in the counter 114 at the start of backward operation is equal to the number of timing marks 38 counted during forward operation associated with recording of the scene. Therefore, when counter 114 holds all zeros during count-down of the backward operation, video recording head 101 is positioned immediately before a starting point 12 of the cut, as will also be an audio recording head, not shown, in the type of system in which the sound is recorded simultaneously. When this state is determined by all-zero detector 128, the latter enables an input 126 of AND gate 128. Since the other input 120 of AND gate 128 is primed by signal B, its output 130 issues in turn a stop signal SP to the control circuit 116. Responsive to stop signal SP, control circuit 116 deenergizes lead 120 to stop the motor 100. The system may be configured so that, at this time, to brake the tape driving mechanism if desired.

In this manner, the video recording head 101 is stopped at the starting point 12 of the scene, as is the audio recording head in a system in which sound is recorded simultaneously with images. The operator then actuates the shutter release button a second time to start shooting at the starting point 12 of the scene which the operator failed in shooting previously.

Figure 5:
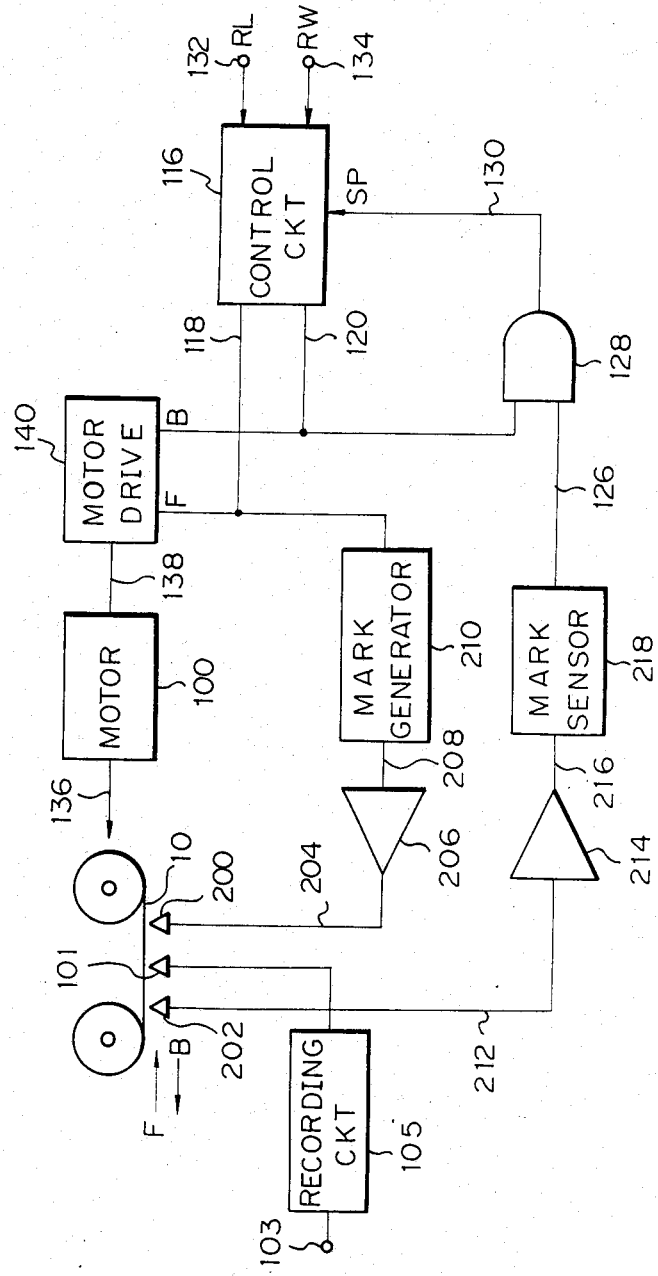
FIG. 5 is a schematic block diagram showing an alternative embodiment of the present invention.

Referring to FIG. 5, there is shown an alternative embodiment of the controlling apparatus according to the present invention. In this figure, the constituent elements similar to those shown in FIG. 3 are designated by the same reference numerals with the corresponding description omitted for simplicity. In the embodiment of FIG. 3, timing signals 38 on the control track of the tape 10 are used for effecting control over recording scenes. In the embodiment of FIG. 5, corresponding marks are separately recorded on the cue track 36 of the tape 10.

In the present embodiment, two magnetic heads 200 and 202 are positioned in contact with the cue track 36 of tape 10 in addition to recording head 101, with 200 being a writing head for writing predetermined marks or signals on the cue track 36, and 202 being a sensing head for reading the predetermined marks recorded on the track 36. It should be noted that the heads 200, 202 and 101 may be combined into a unitary magnetic head assembly if desired.

The writing head 200 has its input lead 204 connected via writing amplifier 206 to an output 210 of a mark generator 210, which is connected to a control output 118 of the control circuit 116 for developing signals responsive to signals F appearing at the output 118. The output signal of the generator 210, which signal will be recorded on track 36, is subsequently used for sensing the position of the starting point 12 of a scene, and may for example be a rectangular signal or a signal of predetermined frequency having a duration of a shorter period of time. The mark thus produced is written by writing head 200 in cue track 36 of tape 10.

The reading head 202 has its output lead 212 connected to an input 216 of a mark sensor 218 via reading or sensing amplifier 214. The output of the mark sensor 218 goes high when the mark recorded on cue track 36 is sensed by the sensor 218 via magnetic head 202. The output of the sensor 218 is connected to one output 126 of AND gate 128.

In the embodiment of FIG. 5, when the control circuit 116 energizes its control output 118 responsive to a shutter release signal RL, and the tape 10 starts to travel in the forward direction F for shooting a scene, the signal F is simultaneously supplied to the mark generator 210. In response thereto, the generator 210 writes corresponding marks on cue track 36 of tape 10 via writing amplifier 206 and writing head 200. Thus the mark is recorded on cue track 36 at a position corresponding to the starting point 12 of the scene.

During shooting of the scene, which is effected in the above described manner, should the operator fail in shooting so that a signal RW is supplied to the control circuit 116, the latter energizes its lead 120 so that the tape 10 starts to be fed in the backward direction B. When the reading head 202 is at a position facing the starting point 12 of that scene on the cue track 36, mark sensor 218 senses the mark on the cue track 36 via head 202 and reading amplifier 214. When the sensor 218 senses the mark, its output 126 goes high. Since the other input 120 of the AND gate 128 is primed by backward feed signal B, the output 130 of AND gate 128 goes high as a result of the high level state of the input 126, so that stop signal SP is introduced into the control circuit 118 which then causes cessation of the operation of the motor 100 immediately.

Figure 6:
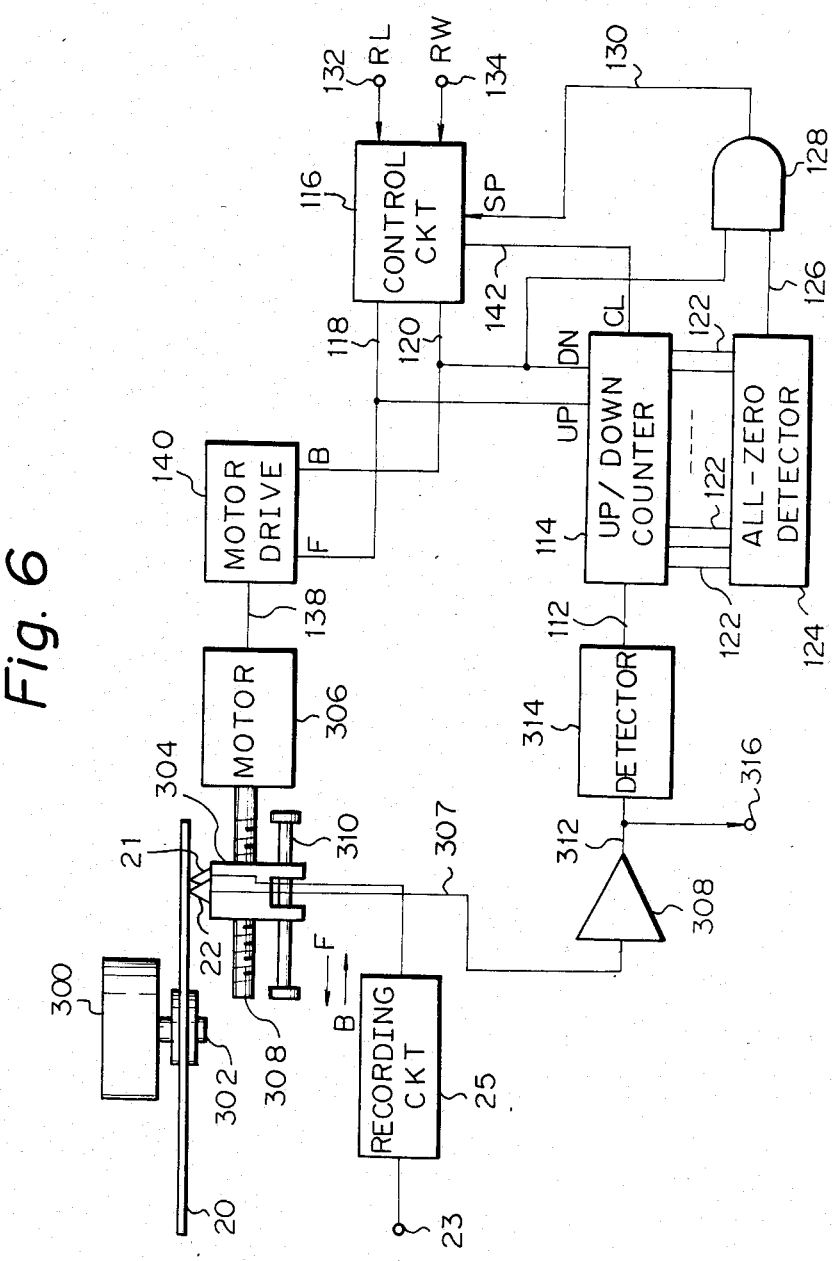
FIG. 6 is a schematic block diagram showing another embodiment of the controlling apparatus according to the present invention when applied to a magnetic disk recording apparatus.

Referring to FIG. 6, there is shown another embodiment of the controlling apparatus of the present invention when applied to a magnetic disk recording system. In this figure, the elements similar to those shown in the embodiments of FIGS. 3 and 5 are indicated by the same reference numerals, and the corresponding description will be omitted for simplicity. Although the embodiment of FIG. 6 corresponds in scheme to the embodiment shown in FIG. 3, the image signal recording tracks 24 are used in the present instance in place of the control track 24 in the embodiment of FIG. 3.

An electric motor 300 rotating constantly at a predetermined speed has an output shaft 302 on which is removably mounted a magnetic disk 20, on the recording surface of which carried are a magnetic writing and sensing heads 21 and 22. It should be noted that the magnetic head may alternatively be designed as a sole recording and reproducing head, and thus may perform not only the function of reproduction but also that of recording. In the illustrative embodiment, video signals are fed from the camera to an input port 23, which is connected to writing head 21 via a recording circuit 25. The heads 21 and 22 are carried by a supporting member 304 engaging with a lead screw 308 in turn coupled to a rotational shaft 308 of a head transport electric motor 306. Thus, when the motor 306 is driven forward or backward, heads 21 and 22 are shifted along a guide member 310 in the directions shown by arrows F and B.

The recording circuit 25, which is similar to recording circuit 105 involved in the embodiments shown in FIGS. 3 and 5, receives on its input port 23 video signals from the camera to provide recording head 22 with the video signals together with control signals including synchronous signals so as to record those signals on tracks 24 of disk 20. The synchronous signals may be associated with those indicating the starting point of a field to be recorded on track 24.

Image signals are sensed from the track 24, FIG. 2, to be produced to an output line 307. These signals are developed at an image signal output terminal 316 via sensing amplifier 308 to be subsequently used as video signals in a utility circuit such as a video circuit, not shown. The amplifier 308 has its output 312 connected also to a detector 314, which, in the present embodiment, may be an envelope detector adapted to extract an envelope of the image signals sensed by the magnetic head 22. Alternatively, the detector 314 may be adapted for detecting tracking signals of a predetermined frequency that are recorded on the tracks 24. The output signals thus detected are shaped into rectangular pulses which are then supplied to an input 112 of the reversible counter 114.

It is now assumed that still images are recorded consecutively on a series of tracks 24 starting from field No. 1 and terminating at field No. n. Responsive to a shooting button actuating signal RL, control circuit 116 causes the motor 306 to be rotated in the normal direction, in such a manner that the head 22 is shifted in the forward direction F to effect the recording on a number of tracks 24 starting from field No. 1. As the image signals are recorded in this manner, the image or tracking signals sensed by the head 22 from the tracks 24 are detected by the detector 314, in such a fashion that a pulse is introduced into the input 112 of counter 114 whenever the head 22 traverses each of the recording tracks 24. Since the count-up input UP of counter 114 is enabled by forward output 118 of the control circuit 116 in this situation, the counter 114 is incremented in response to those pulses.

When the operator failed in shooting a scene, to cause the head 22 to be shifted in the backward direction B for reshooting, a pulse is introduced into counter 114 whenever the head 22 traverses each of the recording tracks 24. Since the count-down input DN of counter 114 is energized by backward output 120 of the control circuit 116 in the instance, the counter 114 is decremented in response to those pulses. When the head 22 is positioned on the track 24 of the field No. 1, the counter 114 includes all zero, which is decoded by all zero detector 124. Responsive thereto, as in the case of the embodiments shown in FIGS. 3 and 5, control circuit 116 causes cessation of the operation of the motor 306 in such a manner that the recording head 21 is also correctly positioned and halted on the track 24 of the field No. 1. A series of images forming a new scene may now readily be recorded in the forward direction F, starting from this track.

Although the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

For example, in the embodiment shown in FIG. 6, predetermined marker signals may be recorded on, for example, the blanking sectors of the first one of a series of tracks involved in consecutive recording, as in the embodiment shown in FIG. 5, in such a manner that those signals may be used as markers for determining the first track during backward tape feeding.

The starting point of one scene may also be detected on the basis of time elapsed since the start of shooting of the scene. In reshooting, tape is fed backward by a length corresponding to the time elapsed. In the case of the disk, the head may be transported in reverse in the similar manner.

In addition, while the tape or disk shown in the illustrated embodiments are driven in reverse by an amount associated with one scene, it is also possible to provide a register for setting the number of scenes to be fed backward feed, together with a counter for counting the number of scenes fed in the reverse direction so as to cause the tape or disk to be driven in reverse for re-shooting over a desired number of the recorded scenes.

From the foregoing, it is appreciated that the present invention provides apparatus for controlling a shooting operation on a scene by scene basis, according to which the recording position can be restored by a simple operation to a point on the recording medium corresponding to a start of a recording scene, thus allowing a new scene to be recorded by a simplified procedure without wasting of the recording medium.

What is claimed is:

1. Apparatus for controlling recording of a scene for use in a television camera for recording video signals representative of a sequence of image frames on a magnetic recording medium in a recording period, comprising:
    first magnetic recording means for recording the video signals on the recording medium;
    control means for sequentially changing the relative position of said first magnetic recording means with respect to said recording medium; and
    storing means for developing and storing tracking information related to a point on the recording medium that corresponds to the start of the sequence of image frames recorded during the recording period;
    said control means including restoring means, responsive to a signal that instructs re-recording for restoring the relative position of said magnetic recording means with respect to said recording medium to a point on said recording medium corresponding to the start of the sequence of the image frames in accordance with the tracking information stored by said storing means.

2. The apparatus according to claim 1, wherein the magnetic recording medium comprises a magnetic tape;
    wherein said magnetic tape includes a control track that stores a marking signal;
    said storing means deriving and storing the tracking information in accordance with said marking signal recorded on said control track of said tape.

3. The apparatus according to claim 1, wherein said magnetic recording medium comprises a magnetic tape;
    said storing means including second magnetic recording means for recording the tracking information on said magnetic tape;
    said control means including means for sensing the tracking information recorded on said magnetic tape when a signal that instructs re-recording is present.

4. The apparatus according to claim 1, wherein said magnetic recording means comprises a magnetic disk;
    wherein the magnetic disk includes tracks, said tracks storing a marking signal;
    said storing means deriving and storing the tracking information in accordance with said marking signals recorded on tracks of said disk.

5. Apparatus for controlling recording of a scene for use in a television camera for recording video signals representative of a sequence of image frames on magnetic tape in a recording period, comprising:

first magnetic recording means for recording the video signals on the magnetic tape;

control means for feeding the magnetic tape in either one of first and second directions opposite to each other; and storing means for developing and storing tracking information related to a point on the tape that corresponds to the start of the sequence of image frames recorded during the feeding of the tape by said control means in the first direction during the recording period;

said control means including restoring means, responsive to a signal that instructs re-recording, for causing the tape to be fed in the second direction opposite said first direction to the point on the tape that corresponds to the start of the sequence of image frames in accordance with the tracking information stored by said storing means.

6. Apparatus according to claim 5, wherein said storing means derives and stores the tracking information from marking signals that are previously recorded on a control track of the tape.

7. Apparatus according to claim 5, wherein said storing means comprises second magnetic recording means for recording the tracking information recorded on the magnetic tape when a signal that instructs re-recording is present.

8. Apparatus for controlling recording of a scene for use in a television camera for recording video signals representative of a sequence of image frames on a magnetic disk having tracks, in a recording period, comprising:

magnetic recording means for recording the video signals on the magnetic disk;

control means for transporting said magnetic recording means on the magnetic disk in either one of a first and a second direction that are opposite to each other; and storing means for developing and storing tracking information related to a point on the disk corresponding to the start of the sequence of image frames recorded during transporting said magnetic recording means on the disk in the first direction during the recording period;

said control means including restoring means, responsive to a signal that instructs re-recording, for causing said magnetic recording means to be transported on the disk in the second direction to the point on the disk that corresponds to the start of the sequence of the image frames in accordance with the tracking information stored by said storing means.

9. Apparatus according to claim 8, wherein said storing means develops and stores the tracking information from marking signals that are previously recorded on the tracks of the disk.

* * * * *